United States Patent
Hong

(10) Patent No.: US 7,203,058 B2
(45) Date of Patent: Apr. 10, 2007

(54) PORTABLE COMPUTER

(75) Inventor: Seung-man Hong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 10/960,057

(22) Filed: Oct. 8, 2004

(65) Prior Publication Data

US 2005/0078444 A1   Apr. 14, 2005

(30) Foreign Application Priority Data

Oct. 9, 2003   (KR) ...................... 10-2003-0070235

(51) Int. Cl.
*G06F 1/16* (2006.01)
*A47B 97/00* (2006.01)
*G09G 5/00* (2006.01)
*G02F 1/1333* (2006.01)

(52) U.S. Cl. .................... 361/681; 361/683; 312/223.1; 345/169; 345/905; 248/917; 248/920; 248/921; 248/922; 248/923; 349/58; 349/65

(58) Field of Classification Search .. 312/223.1–223.6; 248/917–924; 345/169, 905; 353/122, 119, 353/120; 361/681
See application file for complete search history.

(56) References Cited

U.S. PATENT DOCUMENTS 4,202,607 A * 5/1980 Washizuka et al. ......... 349/113
5,900,848 A * 5/1999 Haneda et al. ............... 345/1.1
6,005,767 A 12/1999 Ku et al. ..................... 361/681
6,125,040 A * 9/2000 Nobuchi et al. ............. 361/680
6,266,236 B1 * 7/2001 Ku et al. ..................... 361/681

(Continued)

FOREIGN PATENT DOCUMENTS

KR   1998-60698   11/1998

(Continued)

*Primary Examiner*—Lisa Lea-Edmunds
*Assistant Examiner*—Zachary Pape
(74) *Attorney, Agent, or Firm*—Roylance, Abrams, Berdo & Goodman, L.L.P.

(57) ABSTRACT

A portable computer comprising a computer main body and a display comprising a Liquid Crystal Display (LCD) panel provided on a front thereof and connected to the computer main body. The portable computer comprises a rotation link provided between the display and the computer main body for linking the display and the computer main body; a connecting member provided on a rear of the computer main body for connecting the rotation link. A display hinge is provided on a coupling area of a first end of the rotation link and the display; a main body hinge provided on a coupling area of a second end of the rotation link and the connecting member; and a lock for locking the display in a closed position in which the display is folded relative to the computer main body so that a front surface of the display contacts the computer main body in parallel, or in a tablet operation position in which the display is folded relative to the computer main body so that a rear surface of the display contacts the computer main body in parallel, wherein the lock comprises a locking part provided on one of the rotation link and the computer main body, and a holding part provided on the other one of the rotation link and the computer main body and engaging with the locking part.

20 Claims, 14 Drawing Sheets

U.S. PATENT DOCUMENTS

| | | | |
|---|---|---|---|
| 6,366,935 B2 * | 4/2002 | Hawkins et al. | 361/681 |
| 2003/0142472 A1 | 7/2003 | Park | |

FOREIGN PATENT DOCUMENTS

| | | |
|---|---|---|
| KR | 1998-64166 | 11/1998 |
| KR | 1998-065547 | 12/1998 |
| KR | 1999-303 | 1/1999 |
| KR | 1999-6807 | 2/1999 |
| KR | 1999-15964 | 5/1999 |
| KR | 1999-25547 | 7/1999 |
| KR | 2000-642 | 1/2000 |
| KR | 20-218021 | 1/2001 |
| KR | 10-297746 | 5/2001 |

* cited by examiner

PORTABLE COMPUTER

CROSS-REFERENCE TO RELATED APPLICATIONS

This application claims the benefit under 35 U.S.C. § 119(a) of Korean Patent Application No. 2003-070235, filed Oct. 9, 2003, in the Korean Intellectual Property Office, the disclosure of which is incorporated herein by reference.

BACKGROUND OF THE INVENTION

1. Field of the Invention

The present invention relates to a portable computer. More particularly, the present invention relates to a portable computer capable of supporting a display when the display is in a closed position and in a tablet operation mode stably.

2. Description of the Related Art

The advantages of a portable computer are distinguishable from those of a desktop computer and include portability, convenience in manipulation during a move, and simplicity of design. As used herein, the term "portable computer" refers to a computer that can be carried easily such as a laptop computer, a notebook computer, or a palmtop computer.

For example, a portable computer disclosed in U.S. Pat. No. 6,005,767 comprises a computer main body installed with various components, and a display for displaying a picture by receiving a video signal from the computer main body and installed to be folded and opened relative to the computer main body by first and second hinges. The first hinge comprises a sleeve forming a pair of grooves, and a cylinder comprising a concave part, while the second hinge comprises a sleeve with a similar configuration as the first hinge.

In a conventional portable computer having such a configuration, an angle of the display can be typically adjusted within a range of 0 degrees and 90 degrees at which the display is folded and is opened perpendicular to the computer main body, respectively, or within a range of 0 degrees and 180 degrees at which the display is folded and is opened to face upward, respectively.

Accordingly, if a user wants to operate the portable computer with a keyboard, the portable computer can be used by rotating the display about the second hinge relative to the computer main body to a general operation position in which the display is opened with an angle of roughly 90 degrees relative to the computer main body. Meanwhile, if the user wants to operate the portable computer as a tablet computer using touch screen technology installed in the display, the portable computer can be used in a tablet operation position in which the display is rotated about the first hinge and the second hinge, respectively, to make a rear surface of the display contact a top surface of the computer main body installed with the keyboard, such that the display is in a closed position relative to the main body, but with the display facing out.

In the conventional portable computer, it will be desirable if the portable computer provides a locking part for locking the display in a closed position in which the display forms an angle of 0 degree relative to the computer main body, and in a tablet operation position in which the display is opened 180 degrees from the closed position.

SUMMARY OF THE INVENTION

Accordingly, it is an aspect of the present invention to provide a portable computer capable of supporting a display in a closed position and in a tablet operation position stably.

Additional aspects and advantages of the invention will be set forth in the description which follows.

The foregoing aspects of the present invention are achieved by providing a portable computer comprising a computer main body and a display comprising a Liquid Crystal Display (LCD) panel provided on a front thereof and connected to the computer main body. The portable computer comprises a rotation link provided between the display and the computer main body for linking the display and the computer main body; a connecting member provided on a rear of the computer main body for connecting the rotation link; a display hinge provided on a coupling area of a first end of the rotation link and the display; a main body hinge provided on a coupling area of a second end of the rotation link and the connecting member; and a lock for locking the display in a closed position in which the display is folded relative to the computer main body so that a front surface of the display contacts the computer main body in parallel, or in a tablet operation position in which the display is folded relative to the computer main body so that a rear surface of the display contacts the computer main body in parallel. The lock comprises a locking part provided on one of the rotation link and the computer main body, and a holding part provided on the other one of the rotation link and the computer main body for engaging with the locking part.

According to an aspect of the invention, the locking part comprises a movable latch member installed on the rotation link to move elastically, and the holding part comprises a holding latch member provided on the computer main body.

According to another aspect of the invention, the lock comprises a supporting part coupled with the rotation link and installed with the movable latch member in a transverse direction relative to a longitudinal direction of the rotation link; and a spring member installed on the supporting part and supporting the movable latch member to move elastically relative to the supporting part.

According to a further aspect of the invention, the movable latch member may be formed with a first slope on a first end thereof, and may be provided with a combining part coupling with the spring member on a second end thereof; and wherein the holding latch member may be formed with a second slope corresponding to the first slope so that the holding latch member can slide along the first slope.

According to still another aspect of the invention, the holding latch member may be provided as a pair on opposite circumferences of the computer main body.

According to yet another aspect of the invention, the rotation link may be installed as a pair on opposite circumferences of the display in parallel centering the display.

According to yet another aspect of the invention, the rotation link comprises an external cover forming an external appearance; and an internal cover coupled with the external cover and forming a predetermined accommodation space in the rotation link, the internal cover comprising a first hinge hole formed through a first end thereof, and an extension part formed with a second hinge hole through a second end thereof and extending from the second end thereof.

According to a further aspect of the invention, the display hinge comprises a first shaft member comprising a first rotation shaft accommodated into the first hinge hole rotatably; and a first shaft member supporting bracket installed in the display and supporting the first shaft member on the display.

According to another aspect of the invention, the main body hinge comprises a second shaft member installed between the extension part of the rotation link and an end of the connecting member.

According to still another aspect of the invention, the portable computer further comprises a cable connected to the display on a first side thereof and passing through an internal accommodation space of the rotation link formed by the external cover and the internal cover and connected to the computer main body on a second side thereof.

BRIEF DESCRIPTION OF THE DRAWINGS

The above and/or other aspects and advantages of the present invention will become apparent and more readily appreciated from the following description of the embodiments, taken in conjunction with the accompany drawings of which.

Throughout the drawings, it should be understood that like reference numerals refer to like features and structures.

DETAILED DESCRIPTION OF THE PREFERRED EMBODIMENTS

Reference will now be made in detail to the embodiments of the present invention, examples of which are illustrated in the accompanying drawings.

Figure 1:
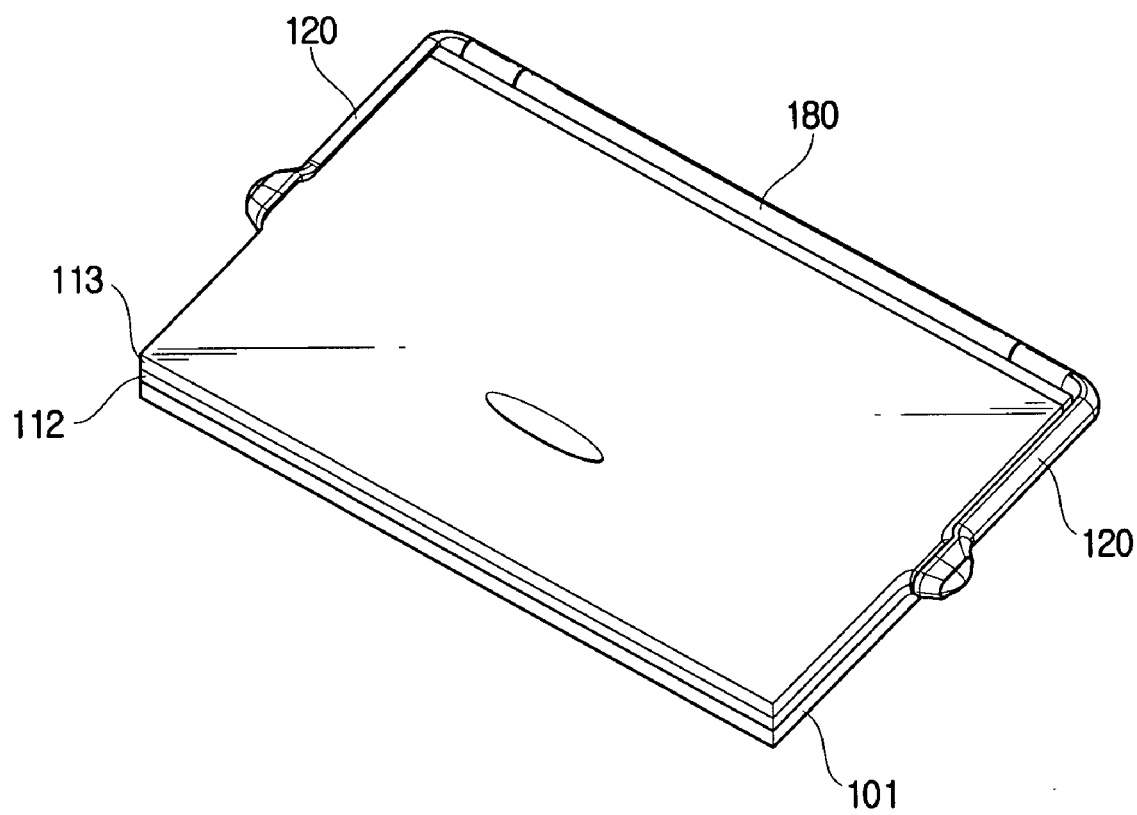
FIG. 1 is a perspective view of a portable computer according to an embodiment of the present invention at a closed position.
Figure 4:
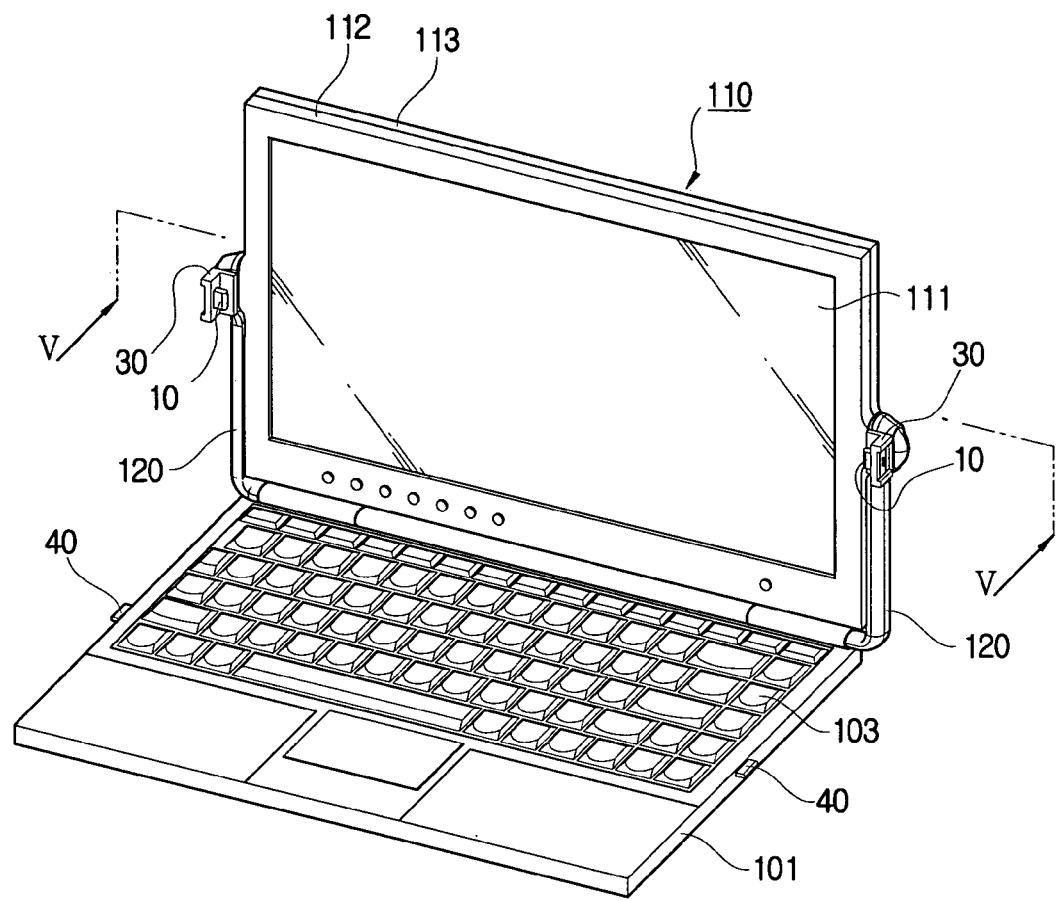
FIG. 4 is a perspective view of the portable computer according to the embodiment of the present invention illustrating the display in an opened state.
Figure 5:
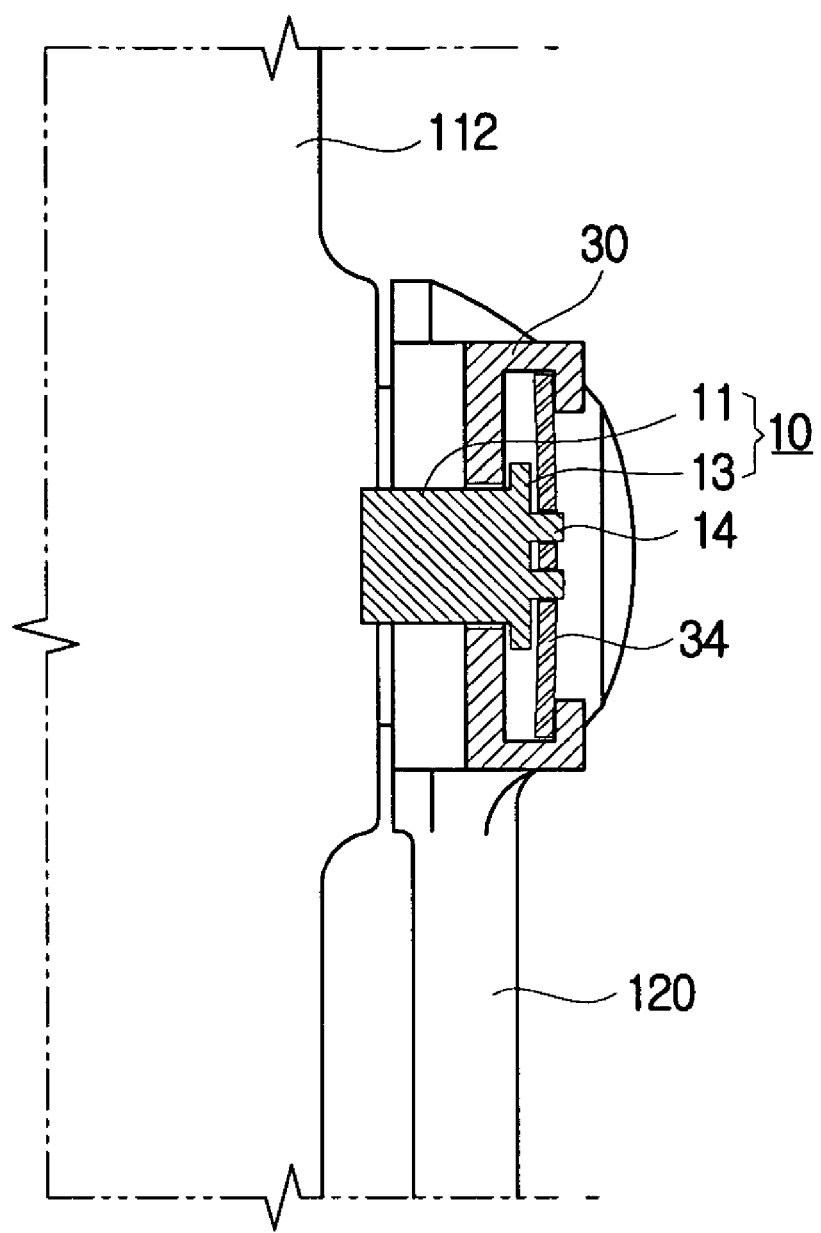
FIG. 5 is a cross-sectional view of the portable computer shown in FIG. 4 taken along line V—V.

As shown in FIGS. 1 and 4, a portable computer according to an embodiment of the present invention comprises a computer main body 101 built having a plurality of components, a display 110 for displaying a picture by receiving a video signal from the computer main body 101, and a pair of rotation links 120 coupled to the computer main body 101 on a first end and hinge-coupled with the display 110 on a second end.

The computer main body 101 comprises a main board (not shown) installed with components such as a central processing unit (CPU) and a graphics chip inside of the computer main body 101, and an input apparatus such as a keyboard 103 and a mouse on the outside of the computer main body 101. Accordingly, the display 110 is connected to the computer main body 101 by a cable 105 (see FIG. 11), which is a signal transfer medium, and displays a picture on a liquid crystal display (LCD) panel 111.

The display 110 comprises built-in touch screen technology enabling the user to manipulate a tablet using a stylus pen. Also, the display 110 comprises an LCD panel 111 for receiving a video signal from the computer main body 101 and displaying a picture, a front cover 112 and a rear cover 113 connected on a front and on a rear of the LCD panel 111, respectively, and supporting the LCD panel 111, and a connecting member 180 provided on a rear of a contacting area between the display 110 and the computer main body 101 and connecting the display 110 and a pair of rotation links 120.

Meanwhile, one of the pair of rotation links 120 connects a first edge of the display 110 and a first edge of the computer main body 101 while the other rotation link 120 connects a second edge of the display 110 and a second edge of the computer main body 101. A display hinge 98 is provided between a first edge of each rotation link 120 and the display 110, and a main body hinge 99 is provided between a second edge of each rotation link 120 and the connecting member 180.

The rotation link 120 is a connector for connecting the display to enable the display 110 to take one of the following positions: a closed position (refer to FIG. 1) in which the display 110 is folded relative to the computer main body 101 so that the front cover 112 of the display 110 contacts the top surface of the computer main body 101 installed with the keyboard 103 in parallel, an open position (refer to FIG. 4) in which the display 110 is opened roughly perpendicular to the top surface of the computer main body 101, and a tablet operation position (refer to FIG. 8) in which the display 110 is folded so that the rear cover 113 of the display 110 contacts the top surface of the computer main body 101 installed with the keyboard 103 in parallel and the LCD panel of the display 110 faces outward for the user.

Figure 10:
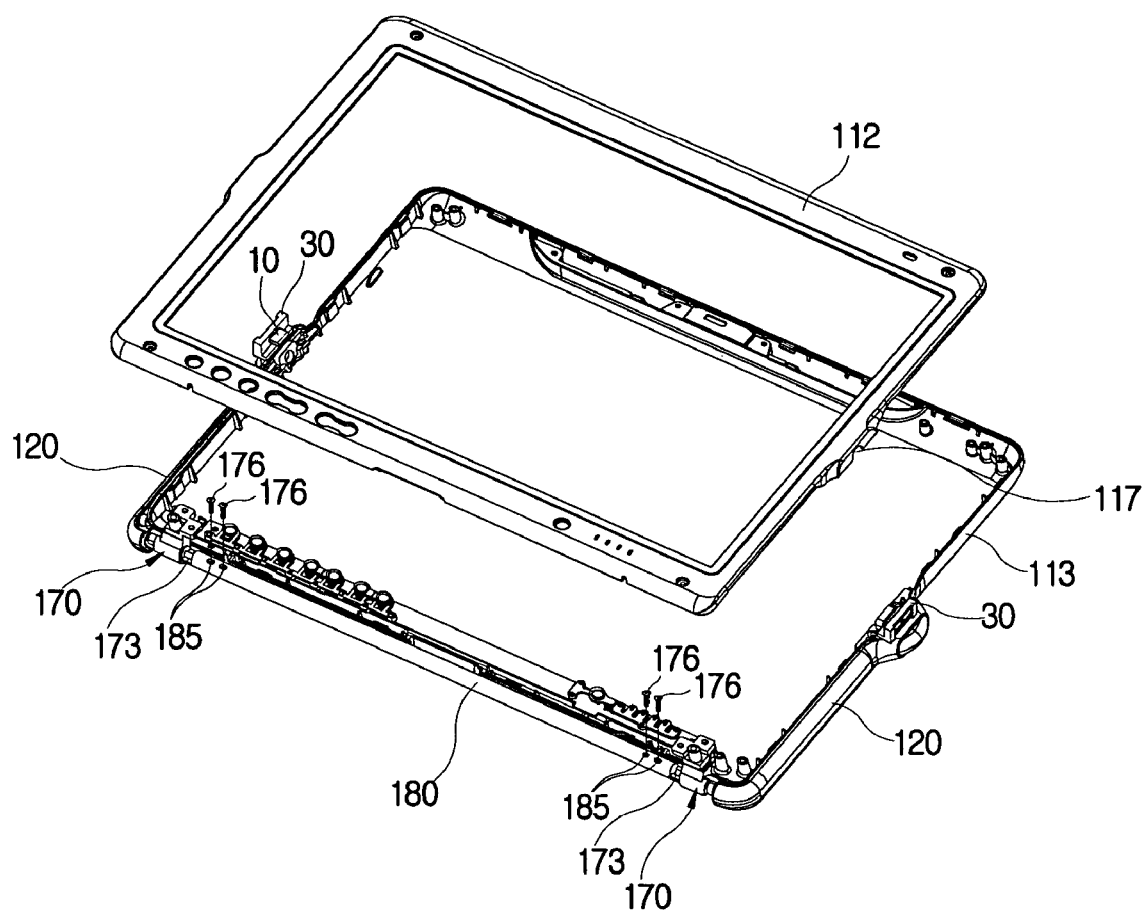
FIGS. 10 and 11 are exploded perspective views of the display according to an embodiment of the present invention.
Figure 11:
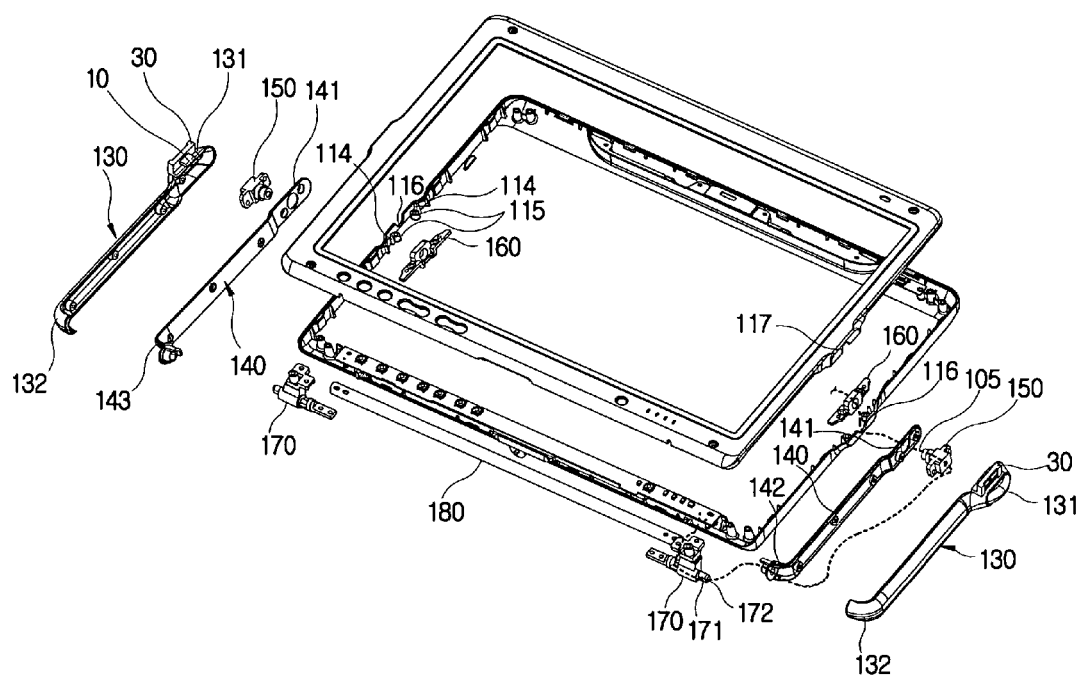

As shown in FIGS. 10 and 11, the rotation link 120 comprises an external cover 130 exposed to the outside and forming an external appearance, and an internal cover 140 coupled with the external cover 130 and forming a cable accommodation space for accommodating the cable 105.

A first end 131 of the external cover 130 is preferably bent to protrude outward and a second end 132 of the external cover 130 is preferably bent inward. Herein, an inside surface of the external cover 130 is formed with a plurality of bosses 133 formed with screw threads spaced from each other with a predetermined distance along a longitudinal direction and connecting with first screws 134 (see FIG. 12) being inserted into coupling holes 146 of the internal cover 140.

The internal cover 140 comprises a first end 141 preferably bent outward and a second end 142 bent inward to be matching to the shape of the external cover 130.

The first end 141 of the internal cover 140 is formed with a first hinge hole 144 accommodating rotatably a first rotation shaft 151 of a first shaft member 150, while the second end 142 of the internal cover 140 is formed with an extension part 143 formed with a second hinge hole 145 accommodating rotatably a second rotation shaft 171 of a second shaft member 170. Also, the internal cover 140 is formed with the plurality of coupling holes 146 for combining the internal cover 140 and the external cover 130 with screw threads of the first screws 134 on positions corresponding to the bosses 133 of the external cover 130.

The display hinge 98 comprises the first hinge holes 144 of the internal cover 140, the first shaft member 150 comprising the first rotation shaft 151 accommodated rotatably into the first hinge hole 144, and a first shaft member supporting bracket 160 supporting the first shaft member 150 comprising the first rotation shaft 151 inserted into the first hinge hole 144 on the rear cover 113.

The first shaft member 150 is accommodated into a predetermined space formed between the first end 141 of the internal cover 140 and the first end 31 of the external cover 130. The first shaft member 150 comprises the first rotation shaft 151 protruding toward the rear cover 113 and accommodated rotatably into the first hinge hole 144 of the internal cover 140, a first cable accommodation hole formed through the first shaft member 150 so that the cable 105 can pass through the first shaft member 150 along an axis line of the first rotation shaft 151, and a pair of coupling parts 153 extending from opposite sides of the first rotation shaft 151 centering the first rotation shaft 151 and installed on the first end 141 of the internal cover 140.

Each coupling part 153 is formed with a through hole 154 on a position corresponding to the pair of coupling holes 146 formed on the first end 141 of the internal cover 140 and to the pair of bosses 133 formed on the first end 131 of the external cover 130. Herein, screw threads of the pair of first screws 134 installed on the first end 141 of the internal cover 140 and the first end 131 of the external cover 130 pass firstly through the coupling holes 146 formed on the first end 141 of the internal cover 140, and secondly through the through holes 154 formed on the coupling part 153 of the first shaft member 150, and lastly get coupled with the bosses 133 formed on the first end 131 of the external cover 130. Accordingly, it functions to connect the first end 141 of the internal cover 140, the first shaft member 150, and the first end 131 of the external cover 130.

The first shaft member supporting bracket 160 comprises a rotation accommodation hole 161 formed through the first shaft member supporting bracket 160 on the same axis line with the first hinge hole 144 of the internal cover 140 to support the first rotation shaft 151 of the first shaft member 150 passing through the first hinge hole 144 of the internal cover 140, a pair of wings 162 extending to protrude from opposite sides thereof. Herein each wing 162 is formed with a protrusion insertion hole 163 in which a protrusion 114 of the rear cover 113 is inserted, and a bolt hole 164 coupled by a coupler 115 formed on the rear cover 113 and a second screw 165.

Meanwhile, the main body hinge 99 comprises a second hinge hole 145 formed on the extension part 143 of the second end 142, and the pair of second shaft members 170 provided between the second end of the rotation link 120 and the connecting member 180.

The second shaft member 170 comprises the second rotation shaft 171 accommodated rotatably into the second hinge hole 145 formed on the extension part 143 of the internal cover 140, and an insertion part 174 inserted into and coupled with one of hollows formed on opposite ends of the connecting member 180 extending along a direction of the second rotation shaft 171.

The second rotation shaft 171 is accommodated rotatably into the second hinge hole 145 formed on the extension part 143 of the internal cover 140. The second rotation shaft 171 is formed with a second cable through hole 172 communicating with the cable accommodation space formed inside the rotation link 120 by the internal cover 140 and the external cover 130 along a direction in which the second rotation shaft 171 is inserted into the second hinge hole 145. Accordingly, the cable 105 passes through a first cable hole of the first rotation shaft 151, the cable accommodation space of the rotation link 120, and the second cable through hole 172 of the second rotation shaft 171.

The insertion part 174 protrudes from the second shaft member 170 toward a direction opposite to the second rotation shaft 171. The insertion part 174 of each second shaft member 170 is coupled with each end of the connecting member 180 which is hollow to accommodate the insertion part 174. In other words, the insertion part 174 of the second shaft member 170 is inserted inside of the end of the connecting member 180. Herein, a third screw 176 is coupled with screw holes 175 formed through the second shaft member 170 and through the connecting member 180 and aligned on the same axis line.

An extraction part 173 is formed between the insertion part 174 and the second rotation shaft 171 to communicate with the second cable through hole 172 of the second rotation shaft 171. Accordingly, the cable 105 passing through a first cable through hole 152 of the first rotation shaft 151 and the cable accommodation space in the rotation link 120 and the second cable through hole 172 of the second rotation shaft 171 is extracted through the extraction part 173 communicating with the second cable through hole 172, and is connected to a printed circuit board (PCB) installed on the rear cover 113.

Meanwhile, the portable computer according to an embodiment of the present invention further comprises a lock 5 for locking the display 110 in the closed position (refer to FIG. 1) in which the display 110 is folded relative to the computer main body 101 so that the front cover 112 of the display 110 contacts the top surface of the computer main body 101 installed with the keyboard 103 being opposite to each other, and at the tablet operation position (refer to FIG. 8) in which the display 110 is folded relative to the computer main body 101 so that the rear cover 113 of the display 110 contacts the top surface of the computer main body 101 installed with the keyboard 103 being opposite to each other to enable the LCD panel 111 of the display 110 to be exposed toward the user.

The lock 5 comprises a movable latch member 10 that is a locking part installed on each rotation link 120 to move elastically. A latch holding member 40 is an engaging part provided on opposite circumferences of the computer main body 101 centering the keyboard 103 and keeping engagement with the movable latch member 10 in the closed position (refer to FIG. 1) and in the tablet operation position (refer to FIG. 8), and a supporter 36 for supporting the movable latch member 10 on the rotation link 120.

The movable latch member 10 comprises a locking protrusion 11 provided on a first side thereof and having a first slope 12 on which the locking protrusion 11 slides along a second slope 41 (see FIG. 6A–6C) of the holding latch member 40, and a combining part 13 provided on a second side thereof and coupled with a supporting part 30. The combining part 13 is provided with a pair of coupling protrusions 14 protruding from a surface and coupling with a plate spring 34 which will be described below.

The supporter 36 comprises the supporting part 30 provided on the rotation link 120 and installed perpendicular to a surface of the front cover 112, and the plate spring 34 that is the spring member installed on the supporting part 30. The plate spring 34 supports movable latch member 10 to enable the movable latch member 10 to move elastically relative to the supporting part 30.

The supporting part 30 is formed with an installing hole 31 (see FIG. 12) through which the locking protrusion 11 of the movable latch member 10 is inserted in a direction perpendicular to a longitudinal direction of the rotation link 120 so that the movable latch member 10 can be installed perpendicular to the longitudinal direction of the rotation link 120. Also, the plate spring 34 is formed with a protrusion hole 35 through which the coupling protrusion 14 of the movable latch member 10 can be inserted.

The latch holding members 40 are provided on opposite circumferences of the computer main body 101 centering the keyboard 103 and corresponding to the movable latch members 10, respectively. The latch holding member 40 is provided with a second slope 41 corresponding to the first slope 12 so that the latch holding member 40 can slide along the first slope 12 of the coupling protrusion 14 of the movable latch member 10.

Figure 12:
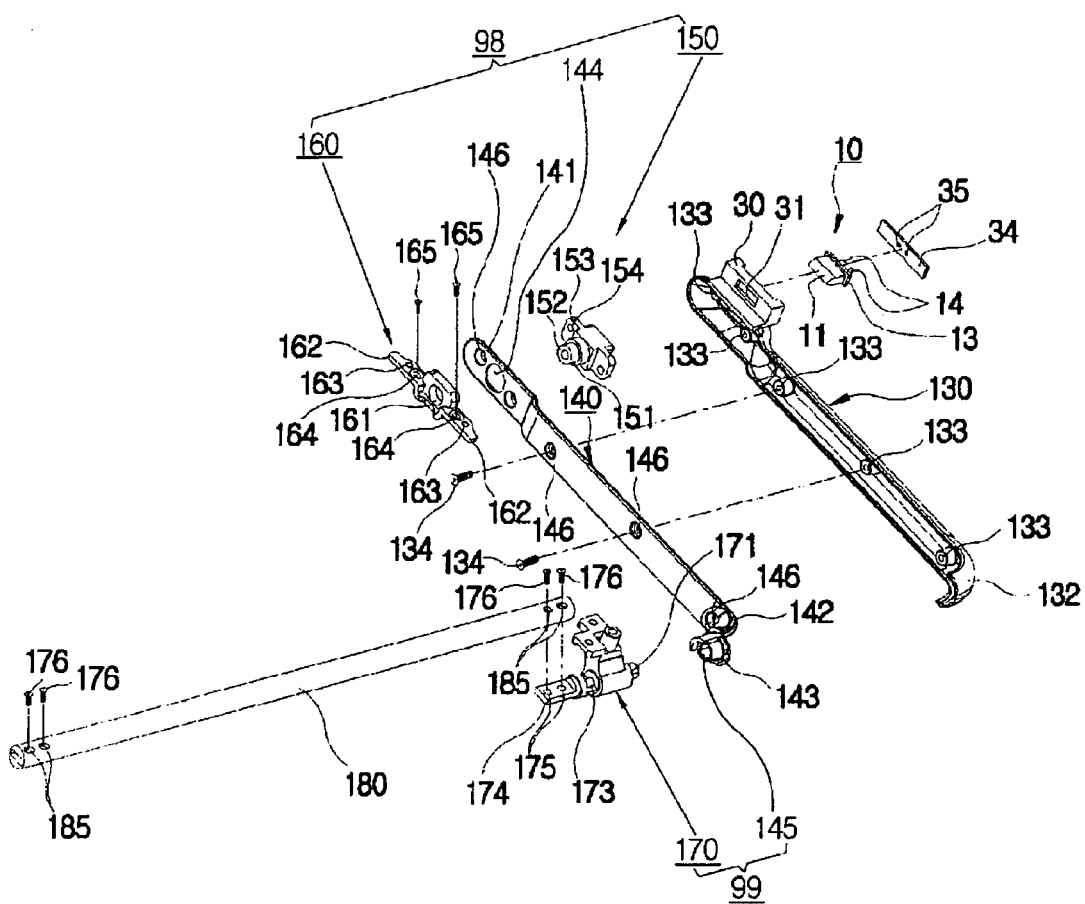
FIG. 12 is a partial perspective view of the portable computer in FIG. 11.

An assembling process of the portable computer according to an embodiment of the present invention will be described in reference to FIGS. 10 through 12.

The internal cover 140 and the external cover 130 are coupled in a state that the first rotation shaft 151 of the first shaft member 150 is inserted into the first hinge hole 144 formed on the first end 141 of the internal cover 140 of the rotation link 120, so that the first shaft member 150 is accommodated in a space formed by the first end 141 of the internal cover 140 and the first end 131 of the external cover 130.

Also, in coupling the internal cover 140 and the external cover 130 with the first shaft member 150 accommodated in the space formed by the first end 141 of the internal cover 140 and the first end 131 of the external cover 130, the screw thread of the first screw 134 is inserted into the coupling hole 146 of the internal cover 140 and is coupled to the boss 133 of the external cover 130.

Herein, the first end 141 of the internal cover 140, the first shaft member 150, and the first end 131 of the external cover 130 are combined by inserting the first screw 134 through the pair of coupling holes 146 formed on the first end 141 of the internal cover 140 and through the pair of through holes 154 formed on the pair of coupling parts 153 of the first shaft member 150, and by coupling the screw thread of the first screw 134 to the boss 133 formed on the first end 131 of the external cover 130.

After completion of the assembly of each rotation link 120 in this way, the pair of rotation links 120 exposing the first rotation shaft 151 through the first hinge hole 144 of the internal cover 140 are coupled with opposite sides of the rear cover 113, respectively.

Herein, the first shaft member supporting bracket 160 is installed on the rear cover 113 as the protrusion 114 of the rear cover 113 is inserted into the protrusion insertion hole 163 formed on the wing 162 of the first shaft member supporting bracket 160 and the second screw 165 passing through the bolt hole 164 of the wing 162 is coupled with the coupler 115 of the rear cover 113. The first rotation shaft 151 exposed through the first hinge hole 144 of the rotation link 120 is inserted into the rotation accommodation hole 161 of the first shaft member supporting bracket 160 installed on the rear cover 113. In this manner, the first rotation shaft 151 protruding outward from the internal cover 140 of each rotation link 120 is placed on a supporting groove 116 of the rear cover 113 in a state of being accommodated in the rotation accommodation hole 161 of a first shaft supporting bracket. Meanwhile, as the first supporting groove 116 shaped like a half circle contacts a second supporting groove 117 shaped like a half circle, a round supporting hole accommodating the first rotation shaft 151 with the rotation accommodation hole 161 is formed.

Meanwhile, as described above, after completion of coupling of the rotation link 120 and a display hinge, the second rotation shaft 171 of the second shaft member 170 is inserted into the second hinge hole 145 formed on the extension part 143 of the internal cover 140, and the insertion part 174 of the second shaft member 170 is inserted into the hollows end of the connecting member 180. Herein, the insertion part 174 of the second shaft member 170 and the connecting member 180 are coupled by combining the third screw 176 into the screw holes 175 formed on the insertion part 174 of the second shaft member 170 and on the connecting member 180 with the same axis line. Meanwhile, in the portable computer according to an embodiment of the present invention, the order of assembly described is arbitrary for the purpose of convenience. Thus, it should be understood that various orders of assembly may be employed.

In a portable computer according to the embodiment of the present invention, a method of shifting a position of the display 110 relative to the computer main body 101 will be described.

Figure 2:
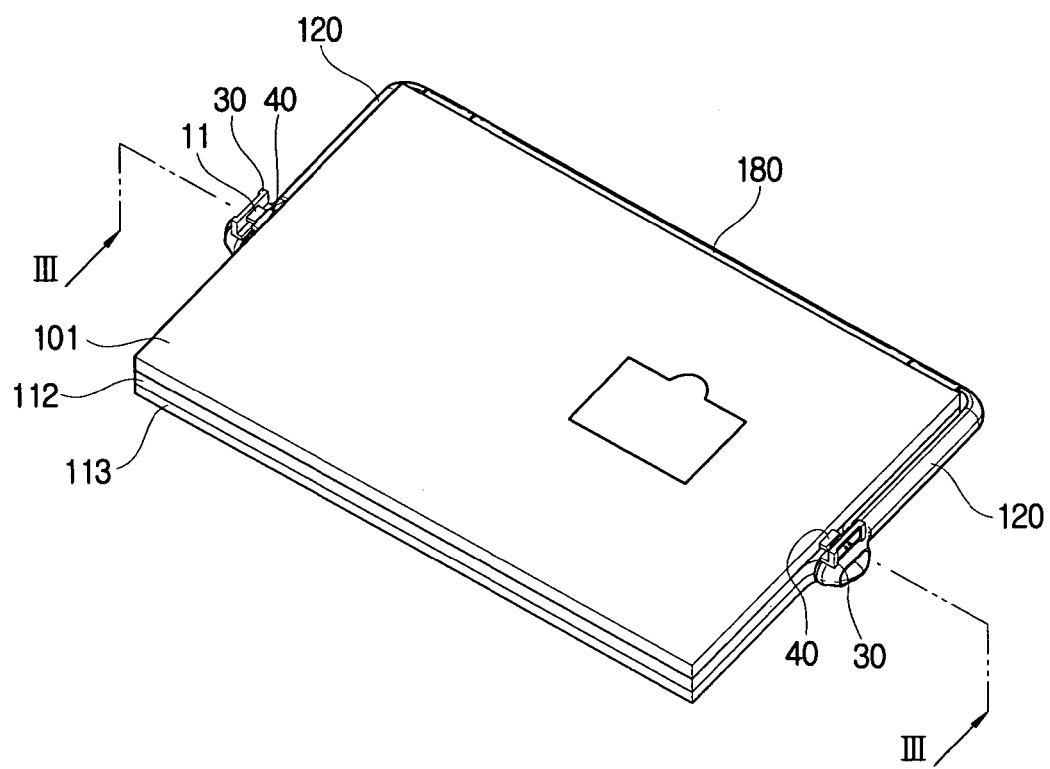
FIG. 2 is a rear perspective view of the portable computer in FIG. 1.
Figure 3:
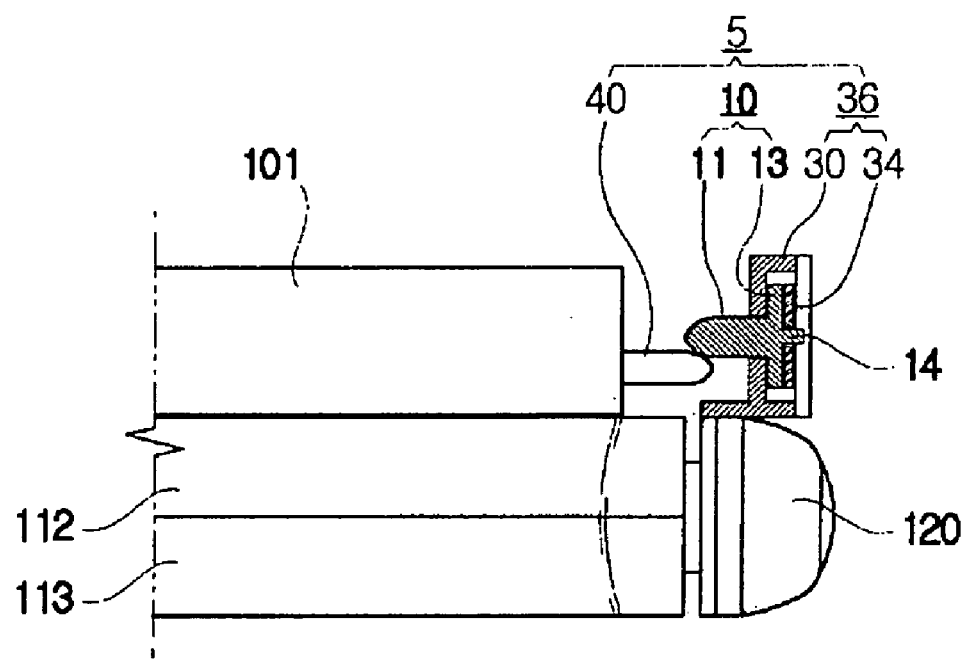
FIG. 3 is a cross-sectional view of the portable computer in FIG. 2 taken along line III—III.

As shown in FIG. 1, the initial state refers to a state that the locking protrusion 11 of the movable latch member 10 installed on the rotation link 120 engages with the latch holding member 40 of the computer main body 101 in the closed position (refer to FIG. 1) in which the display 110 is folded relative to the computer main body 101 so that the front cover 112 of the display 110 and the top surface of the computer main body 101 installed with the keyboard 103 contacting each other in parallel while keeping an elastic equilibrium of the plate spring 34 as shown in FIGS. 2 and 3. The display 110 can be locked in the initial state (refer to FIG. 1) in which the display 110 is folded relative to the computer main body 101 as shown in FIGS. 2 and 3, by engagement of the locking protrusion 11 of the movable latch member 10 and the holding latch member 40.

Accordingly, if the user grips and rotates the display 110 upward off from the top surface of the computer main body 101, the display 110 rotates about the main body hinge 99 as shown in FIG. 4 and reaches the position in which the display 110 is opened perpendicular to the top surface of the computer main body 101 so that the front cover 112 of the display 110 faces forward. In this position, the user can use the keyboard 103 of the portable computer.

Also, in the portable computer shown in FIG. 1, the cable 105, a medium for transferring a signal connecting the computer main body 101 and the display 110, passes through the cable accommodation space formed by the first cable through hole 152 of the first rotation shaft 151 and the rotation link 120, and the second cable through hole 172 of the second rotation shaft 171. The cable 105 is extracted through the extraction part 173 of the second shaft member 170 communicating with the second cable through hole 172 and is connected to the PCB installed on the rear cover 113. Simply, the cable 105 passes along a path as shown in FIG. 11.

Also, when the user wants to use the portable computer as a tablet computer while moving, the display 110 can be moved to the tablet operation position (refer to FIG. 8) in which the display 110 is folded relative to the computer main body 101 so that the rear cover 113 of the display 110 contacts the top surface of the computer main body 101 installed with the keyboard 103 in parallel, enabling the LCD panel 111 of the display 110 is exposed toward the user.

Figure 7:
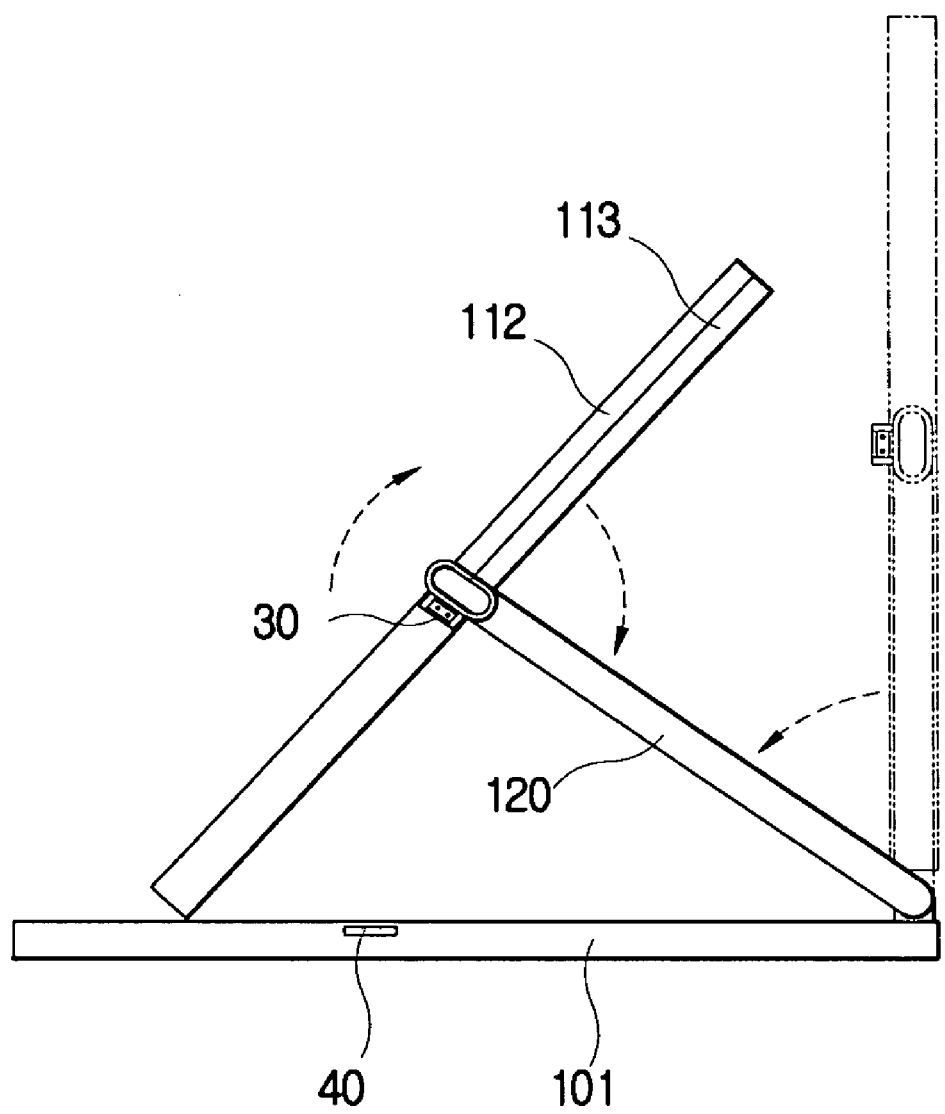
FIG. 7 illustrates rotation of the display from the opened position shown in FIG. 4 to a tablet operation position.

In other words, if the user grips the display 110 and pulls a lower part of the display 110 toward the user, the lower part of the display 110 is positioned above the computer main body 101 while forming an inclined angle with the top surface of the computer main body 101. Meanwhile, torque is generated as the first shaft member 150 and the second rotation shaft 171 rotate in the first hinge hole 144 and the second hinge hole 145, respectively. Thus, the display 110 can maintain a predetermined angle to the computer main body 101 as shown in FIG. 7 unless the user applies force on the display 110. Also, the user may adjust the inclined angle between the display 110 and the computer main body 101.

If the user pulls the lower part of the display 110 to the position shown in FIG. 7 toward the user, the display 110 rotates by the display hinge 98 and the main body hinge 99, and reaches the tablet operation position in which the display 110 is folded relative to the computer main body 101 so that the rear cover 113 of the display 110 contacts the top surface of the computer main body 101 installed with the keyboard 103 in parallel, enabling the LCD panel 111 of the display 110 is exposed toward the user.

Figure 8:
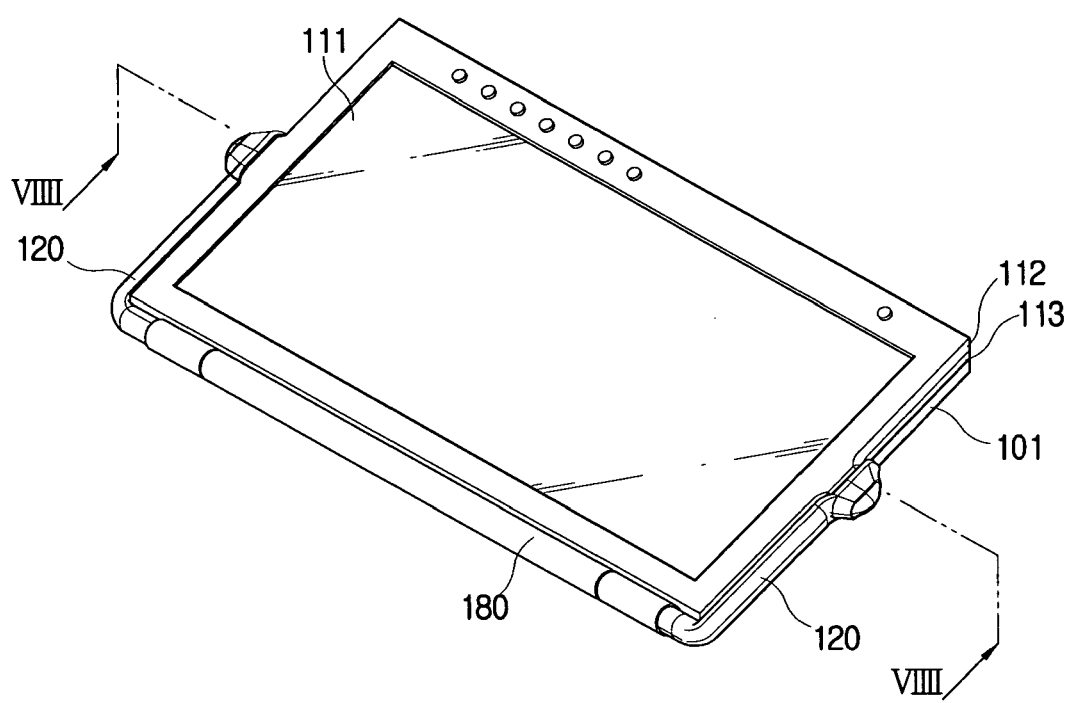
FIG. 8 is a perspective view of the portable computer according to the embodiment of the present invention at the tablet position.
Figure 9:
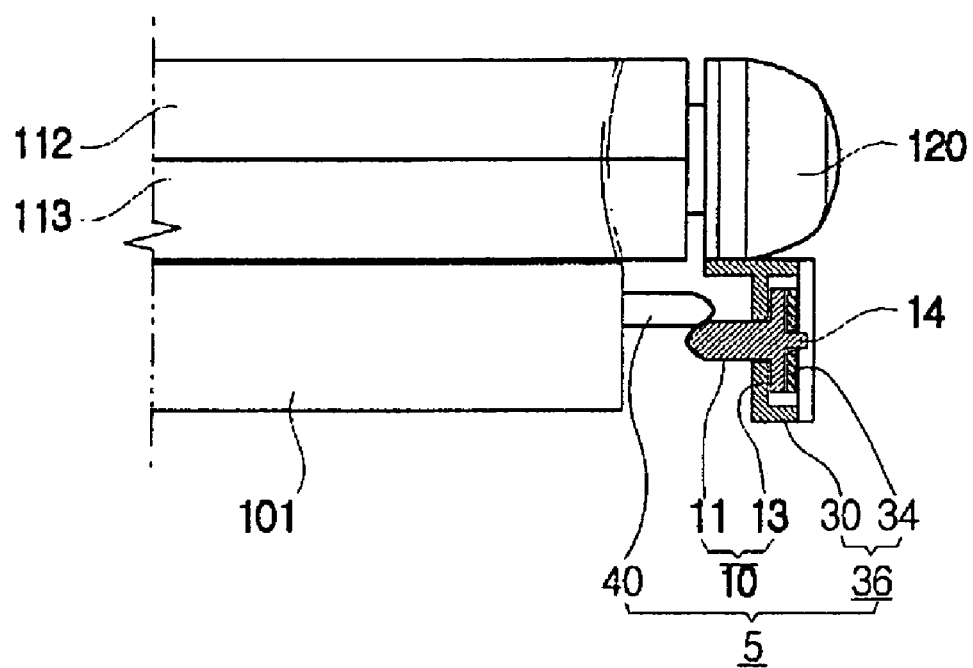
FIG. 9 is a cross-sectional view of the portable computer in FIG. 8 taken along line IX—IX.

In the tablet operation position (refer to FIG. 8) in which the display 110 is folded relative to the computer main body 101 as shown in FIG. 9, the display 110 can be locked by engagement of the locking protrusion 11 of the movable latch member 10 installed on the rotation link 120 and the holding latch member 40.

In the tablet operation (refer to FIG. 8), the user can use the portable computer stably as a tablet computer with a stylus pen while the user is holding the portable computer with the display 110 folded on the computer main body 101 and the LCD panel 111 exposed toward the user. Also, the portable computer with the display 110 in the tablet operation position (refer to FIG. 8) according to an embodiment of the present invention may be placed and used on a desk.

Figure 6A:
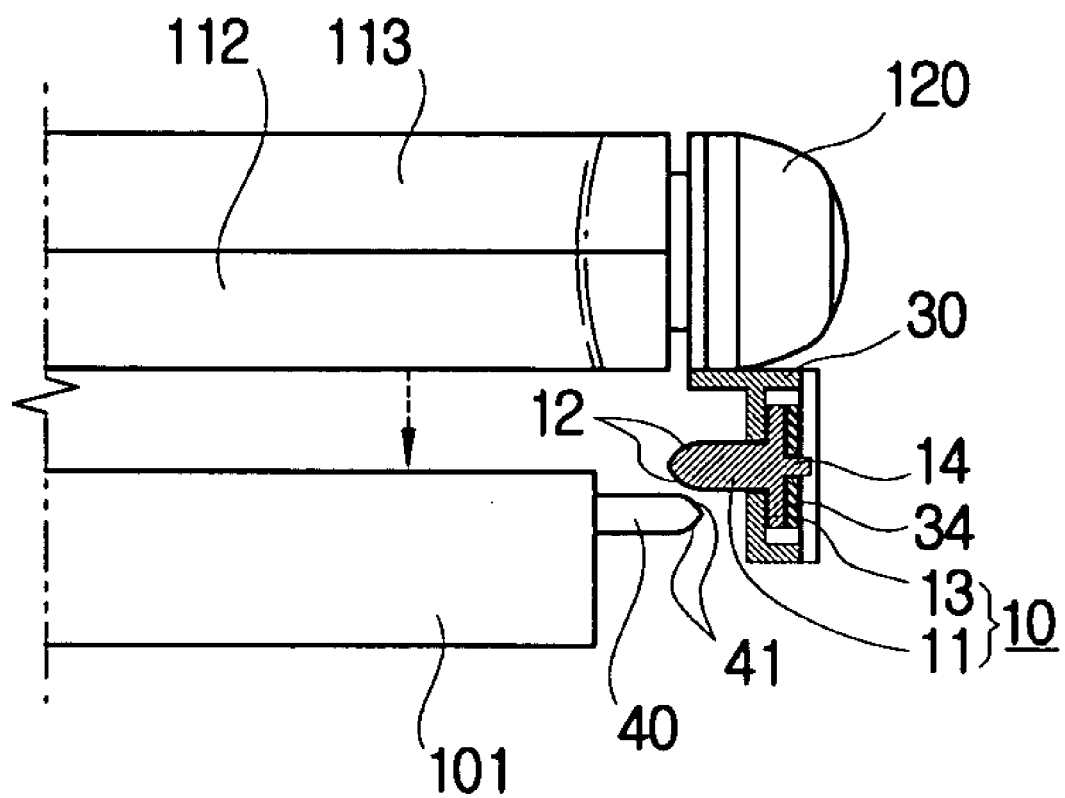
FIGS. 6A through 6C illustrate that the display rotates from an opened position shown in FIG. 4 to a closed position shown in FIG. 1.
Figure 6B:
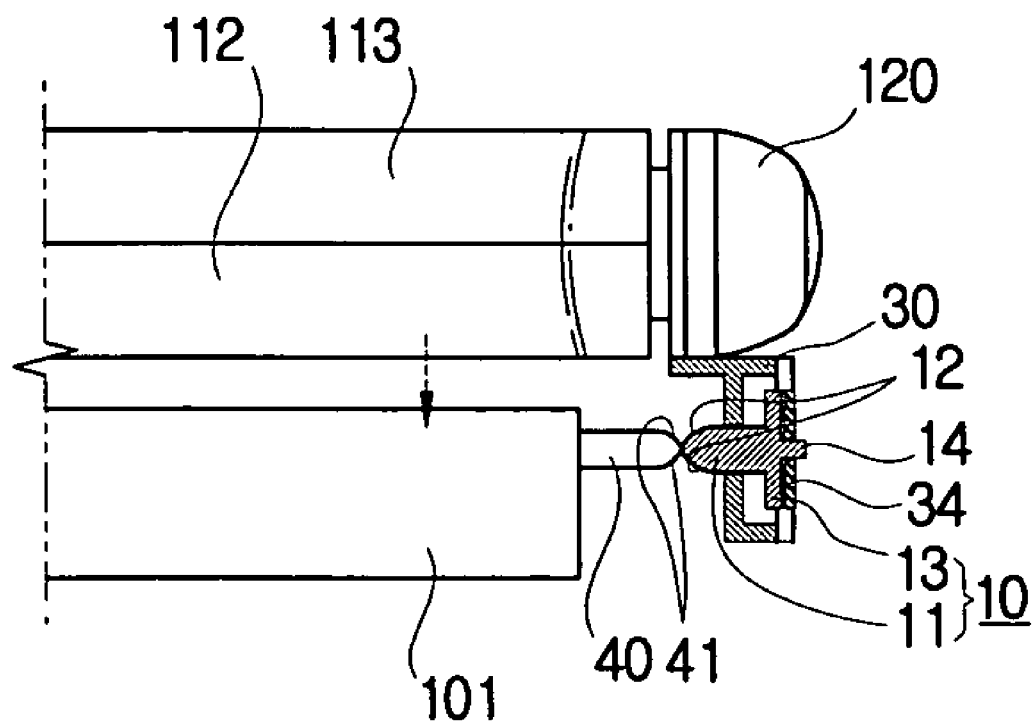
Figure 6C:
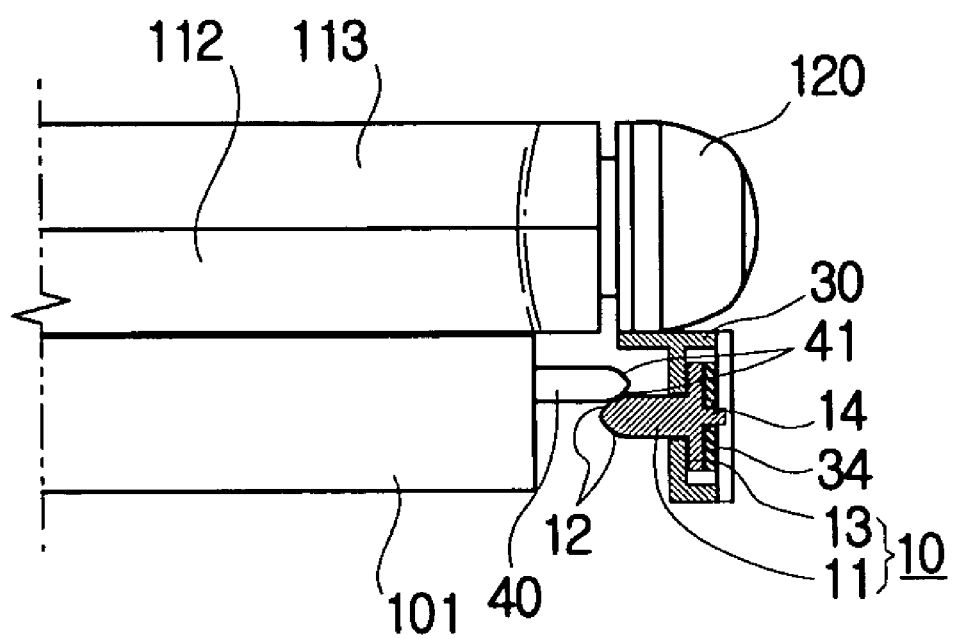

An operation of the engagement between the locking protrusion 11 of the movable latch member 10 installed on the rotation link 120 and the holding latch member 40 provided on the computer main body 101 will be described in reference to FIGS. 6A through 6C. Herein, such an engaging operation can be seen when the user tries to rotate the display 110 from the position in which the display 110 is opened perpendicular to the top surface of the computer main body 101 to enable the front cover 112 of the display 110 to face forward as shown in FIG. 4 to the closed position (refer to FIG. 1) in which the display 110 is folded relative to the computer main body 101 as shown in FIG. 1, so that the display 110 can be locked in the closed position (refer to FIG. 1).

As the user grips the display 110 and rotates the display 110 about the main body hinge 99 in a direction in which the front cover 112 of the display 110 approaches the top surface of the computer main body 101 installed with the keyboard 103, the front cover 112 of the display 110 approaches the top surface of the computer main body 101 gradually. As shown in FIG. 6A, the first slope 12 of the locking protrusion 11 of the movable latch member 10 contacts and slides along the second slope 41 of the holding latch member 40. FIG. 6B illustrates that as the tip of the locking protrusion 11 of the movable latch member 10 contacts the tip of the holding latch member 40, the locking protrusion 11 of the movable latch member 10 is pushed to the rear slightly, bending the plate spring 34 outward slightly. Finally, as shown in 6C, the locking protrusion 11 of the movable latch 10 is locked by the holding latch member 40. Herein, the locking protrusion 11 of the movable latch member 10 can be locked by the holding latch member 40 as the locking protrusion 11 of the movable latch member 10 pushed to the rear is pushed back forward by the resilient force of the plate spring 34 bent outward slightly. Accordingly, the display 110 is locked in the closed position as shown in FIG. 1.

An operation of the engagement between the locking protrusion 11 of the movable latch member 10 and the holding latch member 40 provided on the computer main body 101 will be described in reference to FIGS. 6A through 6C.

Herein, such an engaging operation can be seen when the user tries to move the display 110 from the position (refer to FIG. 4) in which the display 110 is opened perpendicular to the top surface of the computer main body 101 to enable the front cover 112 of the display 110 to face forward as shown in FIG. 4 to the tablet operation position (refer to FIG. 8) in which the display 110 is folded relative to the computer main body 101, so that the display 110 can be locked in the tablet operation position (refer to FIG. 8).

Herein, the rear cover 113 of the display 110 gradually approaches the top surface of the computer main body 101 so that the rear cover 113 of the display 110 contacts the top surface of the computer main body 101. This enables the locking protrusion 11 of the movable latch member 10 to be locked by the holding latch member 40 as shown in FIG. 9, in a case in which the display 110 rotates from the position shown in FIG. 4 (or an opened position) to the tablet operation position (refer to FIG. 8), while the display 110 gradually approaches the top surface of the computer main body 101 so that the front cover 112 of the display 110 contacts the top surface of the computer main body 101 in a case in which the display 110 rotates from the position shown in FIG. 4 (or an opened position) to the closed position (refer to FIG. 1).

Meanwhile, although an embodiment of the present invention provides the movable latch member 10 on the rotation link 120 and a latch holding member 40 on the computer main body 101, the latch holding member 40 and the movable latch member 10 may be provided on the rotation link 120 and on the computer main body 101, respectively without departing from the scope of the present invention.

Also, in an embodiment of the present invention, the latch holding member 40 and computer main body 101 are formed as a single body as shown in FIG. 3. However, the computer main body and the latch holding member may be provided separately, and the latch holding member may be coupled to the computer main body by forming a coupling hole coupling the computer main body and the latch holding member without departing from the scope of the present invention.

As described above, the embodiment of the present invention provides convenience to the user by stably supporting the display in folded and tablet operation positions with a lock.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer comprising:
a computer main body;
a cover supporting a Liquid Crystal Display (LCD) panel provided on a front surface of the cover;
a rotation link provided between the cover and the computer main body for rotatably linking the cover and the computer main body;

a connecting member provided on a rear portion of the computer main body for connecting the rotation link;

a display hinge provided on a coupling area of a first end of the rotation link and the cover, the display hinge pivotably connecting the cover to the first end of the rotation link;

a main body hinge provided on a coupling area of a second end of the rotation link and the connecting member, the main body hinge pivotably connecting the computer main body to the second end of the rotation link; and a lock for locking the display in a closed position in which the cover is folded relative to the computer main body so that a front surface of the cover contacts the computer main body in parallel, or in a tablet operation position in which the cover is folded relative to the computer main body so that a rear surface of the cover contacts the computer main body in parallel, wherein the lock comprises a locking part provided on one of the rotation link and the computer main body, and a holding part provided on the other one of the rotation link and the computer main body and engaging with the locking part.

2. The portable computer according to claim 1, wherein the locking part comprises a movable latch member installed on the rotation link adapted to move elastically, and the holding part comprises a latch holding member provided on the computer main body.

3. The portable computer according to claim 2, wherein the lock comprises:

a supporting part coupled with the rotation link and installed with the movable latch member in a transverse direction relative to a longitudinal direction of the rotation link; and a spring member installed on the supporting part for supporting the movable latch member to move elastically relative to the supporting part.

4. The portable computer according to claim 3, wherein the movable latch member is formed with a first slope on a first end thereof, and provided with a combining part coupling the spring member on a second end thereof; and wherein the latch holding member is formed with a second slope corresponding to the first slope so that the latch holding member can slide along the first slope.

5. The portable computer according to claim 4, wherein the latch holding member is provided as a pair on opposite circumferences of the computer main body.

6. The portable computer according to claim 1, wherein the rotation link is installed as a pair on opposite circumferences of the cover in parallel centering the cover.

7. The portable computer according to claim 6, wherein the rotation link comprises an external cover forming an external appearance; and an internal cover coupled with the external cover and forming a predetermined accommodation space in the rotation link, the internal cover comprising a first hinge hole formed through a first end thereof, and an extension part formed with a second hinge hole through a second end thereof and extending from the second end thereof.

8. The portable computer according to claim 7, wherein the display hinge comprises:

a first shaft member comprising a first rotation shaft accommodated into the first hinge hole rotatably; and a first shaft member supporting bracket installed in the display and supporting the first shaft member on the cover.

9. The portable computer according to claim 8, wherein the main body hinge comprises a second shaft member installed between the extension part of the rotation link and an end of the connecting member.

10. The portable computer according to claim 9, further comprising a cable connected to the LCD display panel on a first side thereof and passing through an internal accommodation space of the rotation link formed by the external cover and the internal cover and connected to the computer main body on a second side thereof.

11. A portable computer comprising:

a computer main body;

a cover supporting a display panel on a front surface of the cover, the cover being movable between a closed position in which the cover is folded relative to the computer main body so that the front surface of the cover contacts the computer main body and a tablet operation position in which the cover is folded relative to the computer main body so that a rear surface of the cover contacts the computer main body;

a rotation link pivotably linking the cover to the computer main body, the rotation link comprising a first end pivotably connected to the cover and a second end pivotably connected to the computer main body;

a locking part disposed on one of the rotation link and the computer main body; and a holding part disposed on the other one of the rotation link and the computer main body, the holding part engaging the locking part to lock the cover in the closed and tablet operation positions.

12. The portable computer according to claim 11, further comprising a display hinge pivotably connecting the cover to the first end of the rotation link.

13. The portable computer according to claim 11, further comprising a main body hinge pivotably connecting the computer main body to the second end of the rotation link.

14. The portable computer according to claim 11, further comprising a connecting member provided on a rear portion of the computer main body for connecting the rotation link.

15. The portable computer according to claim 11, wherein the locking part comprises a movable latch member installed on the rotation link adapted to move elastically, and the holding part comprises a latch holding member provided on the computer main body.

16. A portable computer comprising:

a computer main body;

a display comprising a display panel for displaying a picture and a cover for supporting the display panel, the display being movable between a closed position in which the display is folded relative to the computer main body so that a front portion of the cover contacts the computer main body and a tablet operation position in which the display is folded relative to the computer main body so that a rear portion of the cover contacts the computer main body;

a rotation link pivotably linking the display to the computer main body, the rotation link comprising a first end pivotably connected to the display and a second end pivotably connected to the computer main body;

a locking part disposed on one of the rotation link and the computer main body; and a holding part disposed on the other one of the rotation link and the computer main body, the holding part engaging the locking part to lock the cover in the closed and tablet operation positions.

17. The portable computer according to claim 16, further comprising a display hinge pivotably connecting the cover to the first end of the rotation link.

18. The portable computer according to claim 16, further comprising a main body hinge pivotably connecting the computer main body to the second end of the rotation link.

19. The portable computer according to claim 16, further comprising a connecting member provided on a rear portion of the computer main body for connecting the rotation link.

20. The portable computer according to claim 16, wherein the locking part comprises a movable latch member installed on the rotation link adapted to move elastically, and the holding part comprises a latch holding member provided on the computer plain body.

* * * * *